2,786,879

METHOD FOR COAGULATING RUBBER BLACK MASTERBATCH

Thomas J. Kennedy and Lester G. Nabors, Borger, Tex., assignors to Phillips Petroleum Company, a corporation of Delaware No Drawing. Application January 12, 1953, Serial No. 330,899

5 Claims. (Cl. 260—763)

This invention relates to the production of masterbatched crumb rubber. In one of its aspects the invention relates to the coagulation of rubber latex compounded with carbon black or allied material.

The production of black masterbatches is well known and constitutes no part of the present invention. A general discussion of rubber-masterbatching operations will, however, further the understanding of this invention. It must be recognized however, that specific details of masterbatching process will be varied with the type of carbon black; e. g. channel black, high modulus furnace blacks, etc.; and the type of latex, e. g. whether natural or synthetic. In the case of synthetic rubber, Mooney viscosity of latex, ratio of one monomer to another and polymerization conditions are important.

In general, carbon black is received and made up into a slurry either for storage or for incorporation into the latex, slurries being easier to handle. One method is to dissolve between 9 and 10 percent of a dispersing agent, e. g., a sodium sulfonate in water and adjust the pH to between pH 11 and pH 12 by the addition of sodium hydroxide. A desired amount of pulverized carbon black is then mixed with the dispersing agent solution to produce a slurry of desired solids content. The black is then ready for incorporation into the latex, which can be synthetic or natural. After latex and black slurry are obtained the two are pumped into a mixer and mixed in closely controlled proportions to form a black masterbatch. A separate slurry containing extenders and the like can be also added to the latex along with the carbon black slurry. Methods for producing black masterbatches, and hence the instant invention, apply to both natural latex, such as that obtained from the para-rubber tree (Hevea brasiliensis), and to synthetic rubber latices, for example butadiene-styrene elastomers, neoprene and the like.

After the masterbatch is formed the mixture is pumped to a coagulation tank to produce rubber crumb, coagulation is effected in a manner similar to that used for coagulating non-black copolymer. Agglomeration or creaming is brought about by the addition of brine and flocculation is brought about by the action of dilute sulfuric acid.

Sodium chloride, generaly employed as the creaming agent, is usually controlled by specific gravity, to form a solution of say 7.8 percent sodium chloride, and maintained at a constant temperature, say from 70° F. to 80° F. Acid solution, kept at a temperature say from 100° F. to 115° F., is controlled by pH (to about 1.5). As an example, conditions in a coagulation tank where GR–S is masterbatched with carbon black are: 1.9 to 2.8; salt content 1.0 to 1.2 percent based on the latex; temperature 110° F. to 130° F.; and hold up time 2 minutes.

After coagulation the crumb rubber is separated from the serum, washed, filtered and dried. When unmasterbatched latex is coagulated the crumb is separated from the serum by ordinary flotation methods. However, in the case of masterbatched crumb rubber, which is heavier due to the density of carbon black, separation difficulties are encountered because it does not float. Two of the main operational difficulties encountered in the production of masterbatched crumb are loss of coagulated rubber to the serum and the production of fines. Settling tanks are required to remove crumb lost to the serum, and fines accumulate in the drier creating a maintenance problem and fire hazard.

In accordance with this invention a method for coagulating black masterbatch is provided whereby resulting rubber crumb floats thereby permitting easy removal of the crumb from the serum by floatation methods as in the case of unmasterbatched crumb rubber. In addition when coagulation is carried out according to this invention very few fines are produced. In accordance with this invention part or all of the inorganic salt used in creaming the masterbatched latex is replaced with a water soluble inorganic carbonate or bicarbonate, and when the latex is coagulated with acid sufficient additional acid is used to release carbon dioxide from the carbonate or bicarbonate to bring about the flotation of the resulting rubber crumb. The crumb can then be removed from the surface as is the case when unmasterbatched crumb rubber is produced.

In the coagulation of butadiene-styrene latices prepared by conventional means from about 9 to about 18 percent salt based on the polymer in the latex is used in creaming the latex, and from about 0.3 percent to 4 percent acid based on the polymer in the latex is used in the coagulation of the latex. The salt is generally employed in a 7 to 9 percent aqueous solution, while the acid is usually employed as a 0.1 to 0.5 percent solution. The amount of salt and acid will of course vary with the composition and concentration of the latex, but this amount can be readily ascertained by one skilled in the art. According to the practice of this invention from 10 percent to 100 percent of the conventional creaming agent is replaced by a water soluble carbonate or bicarbonate, e. g. an ammonium or alkali metal carbonate or bicarbonate. Generally sodium carbonate will be used. The usual amount of acid completely to coagulate the latex (e. g. 0.3 percent to 4 percent) plus an additional quantity equivalent to the sodim carbonate or bicarbonate (i. e. enough to completely react with the carbonate or bicarbonate) is used. By this invention carbon dioxide is released from the latex during coagulation producing a porous floating crumb rubber. By this invention the coagulation tank can be adapted with an automatic overflow so that the coagulum will pass from the coagulating tank to a vibrating screen for dewatering. Serum from the screen is collected in a conventional and well-known manner. The crumb rubber is resluried with fresh water and filtered. The crumb thus produced is easier to dry, and the use of the carbonate does not change the finished product in any way.

The particular recipe by which the latex is made is not a part of this invention. In fact the invention is applicable to all elastomers that are masterbatched with carbon black and allied materials, e. g. neoprene, etc. As an example of the invention: butadiene-styrene latex is prepared in a typical reactor by the following recipe by reaction at 41° F. for a period of 6 to 20 hours to a 60 percent conversion or a desired Mooney viscosity of 50:

| Charge: | Parts by weight |
|---|---|
| Butadiene | 72 |
| Styrene | 28 |
| Potassium chloride | 0.5 |
| Water | 200 |
| Rosin acid soap | 4.5 |
| Sulfole (tertiary $C_{12}$ mercaptan) | 0.3 |
| Potassium pyrophosphate (activator) | 0.02 |
| $FeSO_4$ heptahydrate | 0.12 |
| Versene [1] | 0.3 |
| Cumene hydroperoxide | 0.25 |

[1] Tetra sodium salt of ethylenediamine tetracetic acid.

At the desired conversion of 60 percent, 0.15 part by weight of sodium dimethyldithiocarbonate is added as a shortstop. The latex is then passed to strippers for the removal of butadiene and styrene. The latex from the styrene stripper is mixed with a slurry of carbon black containing 20 percent carbon black to form a black masterbatch comprising one part of carbon black and two parts rubber. The latex is now ready for creaming. Forty gallons per minute of the black masterbatch containing 20 to 22 percent polymer is passed to a coagulation tank where twelve gallons per minute of a solution of sodium chloride and sodium carbonate is added, the solution containing 8 percent salt of which 50 percent is sodium carbonate. Enough salt solution is used to obtain a crumb rubber that will filter and dry easily. To coagulate the creamed black masterbatch, forty gallons per minute of 0.2 percent sulfuric acid are added with an excess of twenty-five to sixty-five gallons per minute being added to release carbon dioxide in an amount sufficient to cause the coagulated crumb rubber to float. The resulting crumb rubber is carried off by the overflow from the coagulating tank to a holding tank. The coagulum is then washed, filtered and dried.

It is seen that in accordance with the invention a latex-carbon black-sodium carbonate mixture is coagulated with acid to release carbon dioxide which produces a floating crumb. Modifications in the production of the latex and in the masterbatching thereto are obviously available to those skilled in the art. The invention is therefore, not limited to the specific process disclosed for many variations are within the spirit and scope of this invention.

We claim:

1. In the process for the production of crumb rubber from carbon black-masterbatched latex by creaming said latex with a salt and coagulating the latex with dilute acid the improvement which comprises creaming said black masterbatch with a creaming agent which includes an alkali metal carbonate in an amount sufficient so that carbon dioxide derived therefrom will float resulting crumb rubber, coagulating said latex by the addition of a mineral acid thereto, and concomitantly floating crumb rubber thus formed by the use of carbon dioxide passing through said latex and being liberated from said alkali metal carbonate by an additional amount of acid being added at a rate sufficient to release said carbon dioxide in an amount sufficient to bring about the flotation.

2. In the process for the production of crumb rubber from carbon black masterbatched latex by creaming said latex with a salt and coagulating the latex with dilute acid the improvement which comprises creaming said latex with a creaming agent comprising an alkali metal bicarbonate, coagulating said latex by the addition of a dilute mineral acid thereto, and concomitantly reacting an additional amount of said acid with said carbonate in an amount and at a rate sufficient to release carbon dioxide from said salt thereby passing through said latex bringing about the flotation of rubber crumb.

3. In the process of coagulating carbon black-masterbatched rubber latex by the addition of brine and dilute sulfuric acid thereto the improvement which comprises employing sodium carbonate in place of at least part of the sodium chloride in the brine, sufficient sodium carbonate being used so that carbon dioxide liberated therefrom will pass through said latex thereby floating resulting rubber crumb, adding said dilute sulfuric acid to said creamed latex in an amount equivalent to the carbonate present and in an additional amount sufficient to coagulate said latex, said acid being added at a rate sufficient to release $CO_2$ from said carbonate in an amount sufficient to float said crumb.

4. A process for producing a porous crumb rubber containing carbon black which comprises producing a latex containing an elastomer together with sufficient carbon black to produce, upon coagulation, a crumb rubber too dense to float, adding from 9 to 18 percent by weight, based on the elastomer, of a mixture of inorganic salts to said latex, said mixture of salts consisting of 10 to 100 percent of a material selected from the group consisting of water-soluble carbonates and bicarbonates, and the remainder sodium chloride, thereafter adding acid to the latex in an amount exceeding the quantity required to coagulate the latex by a quantity sufficient to neutralize said carbonate material, said acid being added at a rate whereby carbon dioxide evolved by the reaction between the acid and carbonate passes through the latex and causes the resulting crumb rubber to float, and recovering by flotation the floating crumb rubber.

5. In the process for the production of crumb rubber from carbon black masterbatched latex by creaming said latex with a salt and coagulating the latex with an acid, the improvement which comprises creaming said masterbatched latex with a creaming agent which includes a salt selected from the group consisting of water soluble inorganic carbonates and water soluble inorganic bicarbonates in an amount sufficient that carbon dioxide derived therefrom will bring about flotation of crumb rubber; and adding a coagulating acid in an amount and at a rate sufficient to coagulate said masterbatched latex and to release $CO_2$ from said creaming salt at a rate to concomitantly float the crumb rubber formed by the coagulation of said latex by said $CO_2$ passing up through said latex.

References Cited in the file of this patent

UNITED STATES PATENTS

| 2,378,695 | Fryling | June 19, 1945 |
| 2,567,909 | Adams | Dec. 4, 1951 |